Figure 1:
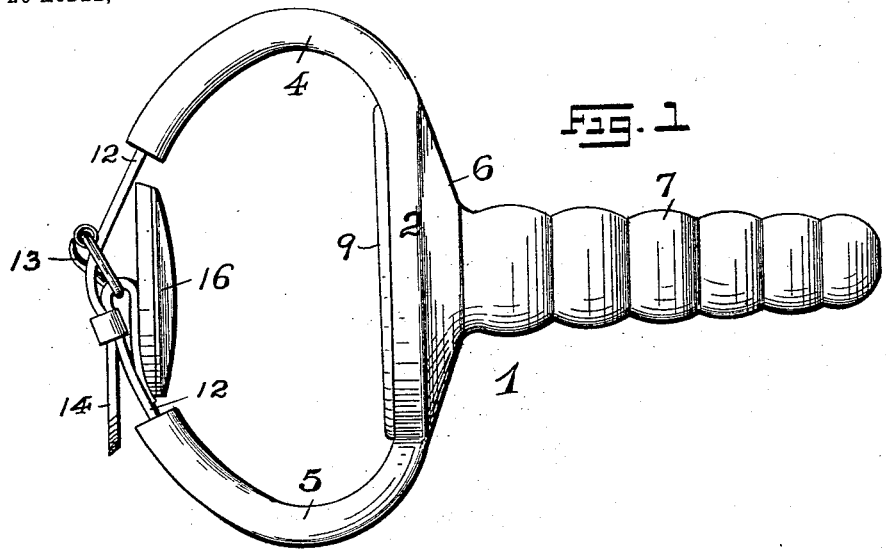

No. 751,115. PATENTED FEB. 2, 1904.
J. STANLEY.
SPREADER FOR THE LEGS OF HORSES.
APPLICATION FILED NOV. 11, 1902.
NO MODEL. 2 SHEETS—SHEET 1.

WITNESSES:
Geo. Douglass
Geo. D. Richards

INVENTOR:
James Stanley
BY
Fred C. Fraentzel,
ATTORNEY

No. 751,115. PATENTED FEB. 2, 1904.
J. STANLEY.
SPREADER FOR THE LEGS OF HORSES.
APPLICATION FILED NOV. 11, 1902.
NO MODEL. 2 SHEETS—SHEET 2.

WITNESSES:
Geo. Douglass.
Geo. L. Richards.

INVENTOR:
James Stanley
BY
Fred L. C. Fraentzel,
ATTORNEY

No. 751,115. Patented February 2, 1904.

UNITED STATES PATENT OFFICE.

JAMES STANLEY, OF NEWARK, NEW JERSEY.

SPREADER FOR THE LEGS OF HORSES.

SPECIFICATION forming part of Letters Patent No. 751,115, dated February 2, 1904.

Application filed November 11, 1902. Serial No. 130,825. (No model.)

*To all whom it may concern:*

Be it known that I, JAMES STANLEY, a citizen of the United States, residing at Newark, in the county of Essex and State of New Jersey, have invented certain new and useful Improvements in Spreaders for the Legs of Horses; and I do hereby declare the following to be a full, clear, and exact description of the invention, such as will enable others skilled in the art to which it appertains to make and use the same, reference being had to the accompanying drawings, and to numerals of reference marked thereon, which form a part of this specification.

This invention has reference to improvements in spreaders or boots for the legs of horses that are apt to interfere; and the invention relates more particularly to a novel construction of spreader made of rubber or other analogous flexible material having a laterally-extending and resilient arm or projection extending from a body portion which is adapted to be attached to the leg of the horse, the said laterally-extending arm or projection being made with an interiorly-arranged reinforcing device which has sufficient resiliency to permit of the rebounding actions of the said arm or projection while being struck by the oppositely-placed leg of the horse, but the said reinforcing device preventing the severing or breaking off of the said resilient arm or projection from the practically rigid body portion with which it is connected when the spreader is constantly in use upon the leg of the horse.

The invention has for its principal objects to provide a neat, simple, and cheaply-constructed spreader of the character and for the purposes to be hereinafter more fully set forth and one in which the laterally-extending resilient arm or projection, which is subject to constant and rapid vibrations during the use of the device, is not likely to become severed or broken off from the main body of the spreader.

The invention therefore consists in the novel construction of spreader hereinafter fully set forth; and, furthermore, this invention consists in the various novel arrangements and combinations of parts, all of which will be fully described in the following specification and then finally embodied in the clauses of the claim.

The invention is clearly illustrated in the accompanying drawings, in which—

Figure 2:
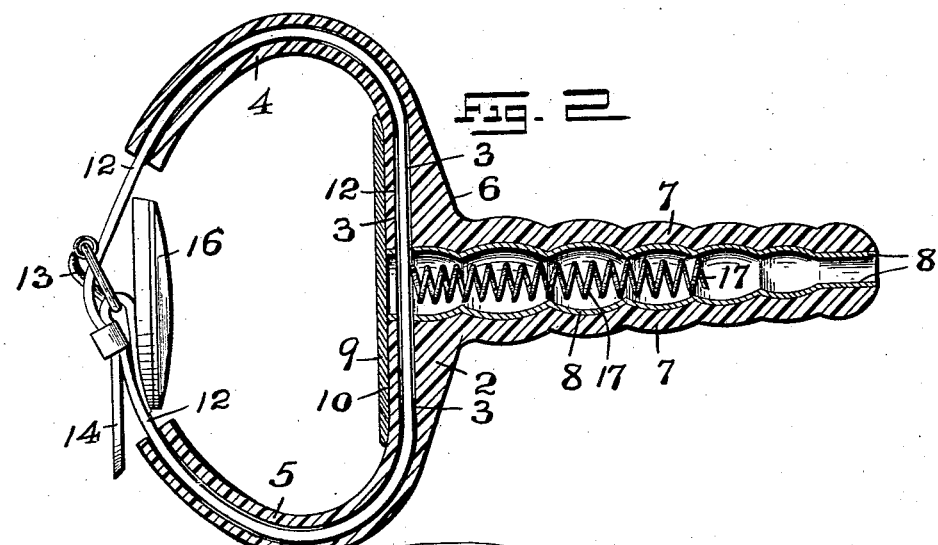
Figure 3:
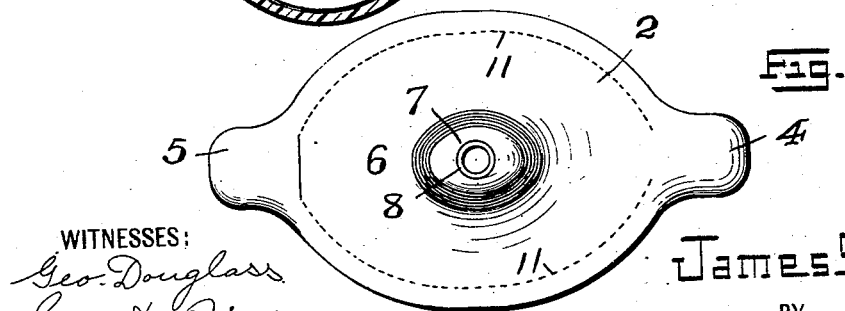
Figure 4:
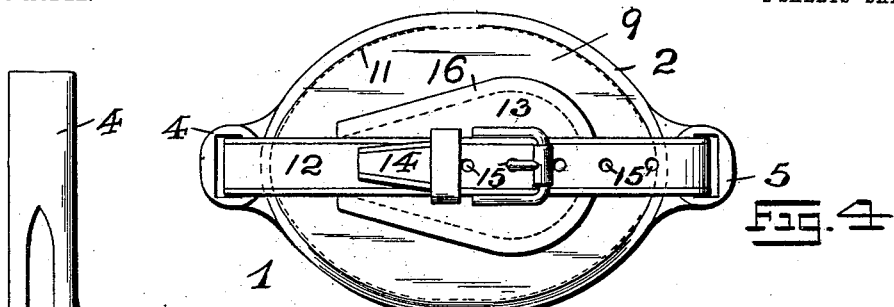
Figure 5:
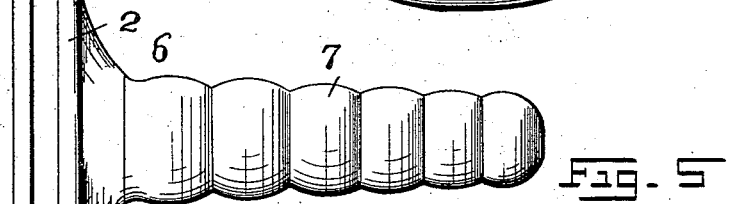
Figure 6:
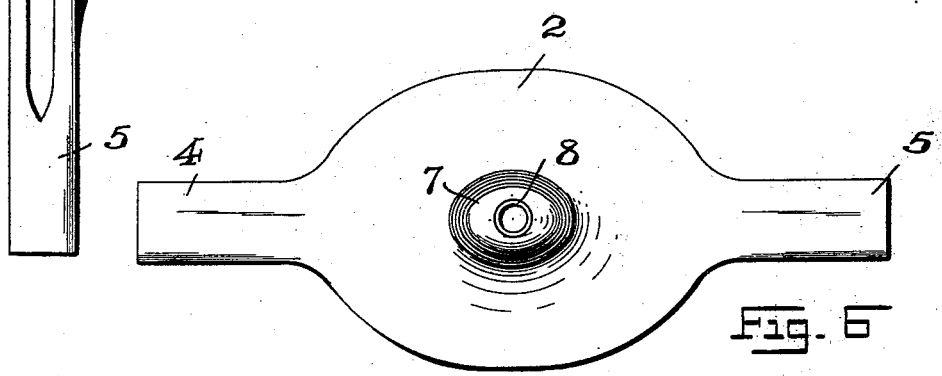
Figure 7:
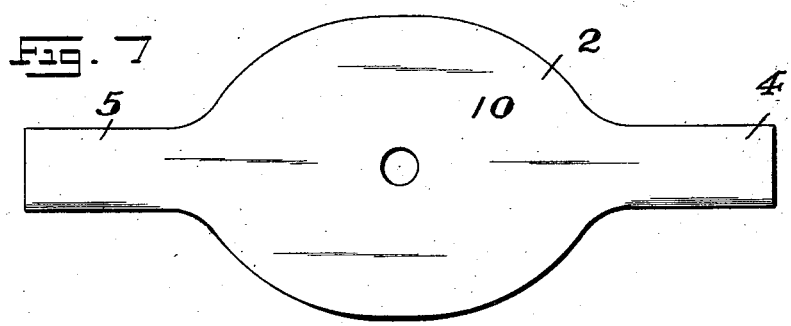

Figure 1 is a side view of a spreader embodying the novel features of my present invention, and Fig. 2 is a longitudinal vertical section of the same. Figs. 3 and 4 are the two end views of the spreader. Fig. 5 is a view of the main body and laterally-extending arm or projection connected therewith, both made of a suitable flexible material, such as rubber or other analogous material, the padding devices and attaching-strap being omitted from the view; and Figs. 6 and 7 are the respective end views of the same.

In the said drawings the reference-numeral 1 indicates the complete boot or spreader made according to the present invention, the same consisting, essentially, of a main body 2, of rubber or other analogous flexible material, having a channeled or similarly-formed interior 3 and a pair of oppositely-extending tubular arms or members 4 and 5, the tubular portion of each arm or member communicating with the interior or channel 3 of the said main body 2, substantially as illustrated in said Fig. 2 of the drawings. Integrally united with the face 6 of the said main body 2 is a laterally-extending and flexible tubular arm or projection 7, the interior of the said arm or projection 7 being preferably lined with a suitable reinforcing material 8, such as duck or the like. A suitable pad 9, preferably of leather, is suitably secured against the inner and flat side 10 of the said main body portion 2 by means of stitches 11 or in any other well-known manner. A strap 12, provided with a buckle 13 or other suitable fastening device and having a free fastening end 14, provided with the usual perforations 15, as shown in Fig. 4, is then arranged in the channel 3 of the body portion 2 and within the tubular members or arms 4 and 5, as represented in Fig. 2, so that the end of the strap which is provided with the buckle 13 and the free fastening end 14 of the strap will project from the ends of the respective members 4 and 5, as clearly illustrated in Figs. 1, 2, and 4. The buckle end of the strap is also preferably provided with any suitably-constructed pad 16, so that the device can be secured about the leg of the horse without danger of discomfort or abrasion of the skin.

It will be clearly evident that when the device has been attached in its proper position upon the leg the laterally-extending flexible arm or projection 7, being placed directly opposite the other leg of the horse, will be subject to rapid vibratory action, whereby the said arm or projection 7, where it is rigidly connected with the main body portion 2 of the device, would soon become sufficiently weakened and render the said arm or projection useless for the purposes for which it is intended, and, furthermore, the said arm or projection 7 might be easily severed from the said main body portion. To avoid this and to provide under all conditions a perfectly-resilient arm or projection 7 which will at all times resume its normally rigid and straight relation with the said body portion 2, a reinforcing device, such as a coiled spring 17, having rebounding properties, is arranged within the inner portion of the said arm or projection 7, substantially in the manner illustrated in Fig. 2 of the drawings, and thereby all danger of the arm or projection 7 becoming weak or breaking off at its point of connection with the main body portion 2 is entirely obviated.

I am aware that some changes may be made in the various arrangements and combinations of the parts without departing from the scope of my present invention. Hence I do not limit my invention to the exact arrangements and combinations of the parts as described in the foregoing specification and as illustrated in the accompanying drawings, nor do I confine myself to the exact details of the construction of the said parts.

Having thus described my invention, what I claim is—

1. A spreader for the legs of horses consisting, essentially, of a main body portion provided with a laterally-extending channel 3, a rearwardly-extending arm integrally united with said body portion, having a tubular portion 8 extending at a right angle, or approximately so, from said channel 3, oppositely-extending members 4 and 5 integrally united with said main body portion, each member having a tubular portion in communication with said laterally-extending channel 3 in the said main body portion, and a fastening-strap arranged in the tubular portions of said members 4 and 5 and in said channel 3, said strap having its respective ends projecting from the free end portions of said members 4 and 5, and means connected with the free ends of said strap for attaching said spreader with its members 4 and 5 in curved relation about the leg of the horse, substantially as and for the purposes set forth.

2. A spreader for the legs of horses consisting, essentially, of a main body portion provided with a laterally-extending channel 3, a rearwardly-extending arm integrally united with said body portion, having a tubular portion 8 extending at a right angle, or approximately so, from said channel 3, oppositely-extending members 4 and 5 integrally united with said main body portion, each member having a tubular portion in communication with said laterally-extending channel 3 in the said main body portion, a fastening-strap arranged in the tubular portions of said members 4 and 5 and in said channel 3, said strap having its respective ends projecting from the free end portions of said members 4 and 5, means connected with the free ends of said strap for attaching said spreader with its members 4 and 5 in curved relation about the leg of the horse, and a coiled spring in the tubular portion 8 of said rearwardly-extending arm, substantially as and for the purposes set forth.

3. A spreader for the legs of horses consisting, essentially, of a main body portion provided with a laterally-extending channel 3, a rearwardly-extending arm integrally united with said body portion, having a tubular portion 8 extending at a right angle, or approximately so, from said channel 3, oppositely-extending members 4 and 5 integrally united with said main body portion, each member having a tubular portion in communication with said laterally-extending channel 3 in the said main body portion, a fastening-strap arranged in the tubular portions of said members 4 and 5 and in said channel 3, said strap having its respective ends projecting from the free end portions of said members 4 and 5, means connected with the free ends of said strap for attaching said spreader with its members 4 and 5 in curved relation about the leg of the horse, a reinforcing-lining in the tubular portion 8 of said rearwardly-extending arm, and a reinforcing device within said lining, substantially as and for the purposes set forth.

4. A spreader for the legs of horses consisting, essentially, of a main body portion provided with a laterally-extending channel 3, a rearwardly-extending arm integrally united with said body portion, having a tubular portion 8 extending at a right angle, or approximately so, from said channel 3, oppositely-extending members 4 and 5 integrally united with said main body portion, each member having a tubular portion in communication with said laterally-extending channel 3 in the said main body portion, a fastening-strap arranged in the tubular portions of said members 4 and 5 and in said channel 3, said strap having its respective ends projecting from the free end portions of said members 4 and 5, means connected with the free ends of said strap for attaching said spreader with its members 4 and 5 in curved relation about the leg of the horse, a reinforcing-lining in said tubular portion 8 of said rearwardly-extending arm, and a coiled spring within said lining, substantially as and for the purposes set forth.

In testimony that I claim the invention set forth above I have hereunto set my hand this 10th day of November, 1902.

JAMES STANLEY.

Witnesses:
　FREDK. C. FRAENTZEL,
　GEO. D. RICHARDS.